June 26, 1956  J. P. BURKE  2,752,235
METHOD AND APPARATUS FOR MAKING STEEL
Filed May 27, 1952  2 Sheets-Sheet 1

INVENTOR.
James P. Burke.
BY W. B. Harpman
ATTORNEY.

June 26, 1956 J. P. BURKE 2,752,235
METHOD AND APPARATUS FOR MAKING STEEL
Filed May 27, 1952 2 Sheets-Sheet 2

INVENTOR.
James P. Burke.
BY W. B. Harpman
ATTORNEY.

United States Patent Office 2,752,235
Patented June 26, 1956

2,752,235

METHOD AND APPARATUS FOR MAKING STEEL

James P. Burke, Poland, Ohio, assignor to Ethel M. Burke, Poland, Ohio

Application May 27, 1952, Serial No. 290,301

7 Claims. (Cl. 75—60)

This invention relates to a metallurgical apparatus and process and particularly to a metallurgical apparatus to be used for the production of steel where a controlled amount of carbon, phosphorus and silicon is desired.

It is an object of the present invention to provide an improved metallurgical apparatus and process for a continuous treatment of molten metal from either an open hearth or blast furnace.

Another object of the present invention is to provide an improved apparatus and process that will control the amount of carbon, phosphorous and silicon whereby a desired reduction in the amount of carbon, phosphorus and silicon is achieved and steel produced having a much finer grain structure throughout.

The steel industry has been using to advantage the induction of oxygen into the open hearth furnace either into the molten metal or above the surface thereof to reduce the carbon content of the steel. The same method has been applied to blast furnace iron in place of the conventional Bessemer process. A slight variation in this process for the treatment of iron is a lower oxygen content of the treatment, as, for example, air has been blown over the surface of the iron to raise the temperature of the metal, thereby causing some of the carbon and other impurities to burn. It has been proposed to use carbon dioxide ($CO_2$) to reduce the carbon content of the iron. The induction of carbon dioxide ($CO_2$) over the metal will not reduce the carbon appreciably but will create a finer grain of carbon which is more readily and evenly distributed throughout the metal as the process breaks up the larger particles of carbon which is advantageous. One of the drawbacks in the use of carbon dioxide ($CO_2$) is that it requires an additional method of heating the metal to keep it hot and near the boiling point. It is this extra heating that somewhat reduces the amount of carbon.

In many of the present methods which have been proposed the decarbonization is low and uneven with a lesser degree of decarbonization than that which is desired and at the speed desired as they depend upon the boiling and burning off of the carbon from the surface only. If air or oxygen enriched air is employed below the surface or at the bottom of the molten mass as is the case of the Bessemer process, carbon and other impurities are burned off but the nitrogen content is increased which is detrimental. This process also retains a great amount of phosphorus and silicon.

The present invention relates to apparatus for receiving the metal from the open hearth or blast furnace. When used in conjunction with the open hearth, the steel is tapped from the open hearth and is passed through a metering gate and down a passageway to the bottom of a decarbonizing retort. The bottom of the retort is slightly inclined away from the passageway and terminates in an upwardly and inwardly projecting wall which directs the flow of the metal to the top of the incoming metal and back toward the passageway. The metal flows along the bottom of the retort and is diverted upwardly by the curved end wall and then flows in a reverse manner on the surface of the pool. As the metal is progressively flowing and rising in the retort, air or oxygen, or oxygen enriched air, as the necessity may require, is forced over the top of the metal in the retort. As the metal progressively rises and reverses its flow, the air or oxygen treatment continues. The metal is thereby decarbonized in a controlled degree by the amount of oxygen or air applied, the metal being uniformly decarbonized by every fraction of an inch in its progressive flowing action. The metal is then tapped off into the usual ladle or ingot molds.

In the case where iron is to be decarbonized the same apparatus is employed but built as a separate unit. The iron is poured from a ladle into a receiving chamber and from there it passes through a metering gate and down the passageway. The remainder of the progressive flowing action is the same as having been recited above. The design of this retort is the same with the exception that it must have a gated opening for the slag to be run off. It must also have an orifice for the admitting of burned lime. This orifice may be in the form of a pipe for the burned lime to be blown in or it may be just the conventional charging door type.

The operation of apparatus where iron is used is the same as with open hearth steel with the exception that a series of valves or one combination valve is employed that will admit oxygen or an oxygen enriched air and carbon dioxide in an alternate manner. This cycling of air or oxygen enriched air and carbon dioxide may be timed and operated through an automatic valve. The air or oxygen enriched cycle raised the temperature of the metal sufficiently to overcome the slight cooling action of the carbon dioxide. These cycles, when properly timed, will keep the metal to the desired temperature so that the carbon dioxide will be able to function properly. In this process where iron is to be decarbonized and made into steel, it is necessary for the addition of burned lime to remove impurities such as phosphorus and silicon. The impurities will mix with the lime and can be floated off as slag. There being no below the surface agitation in the flow of the metal in the retort, it reduces the nitrogen absorption of the metal as the air is not blown through the metal as is done in the Bessemer process.

The present invention relates to a method and apparatus of handling molten iron or steel and progressively subjecting it to a desired oxygen or oxygen enriched atmosphere in a manner so that each and every portion of the metal being treated is subjected to the oxygen or oxygen enriched atmosphere and a uniform decarbonizing effected.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
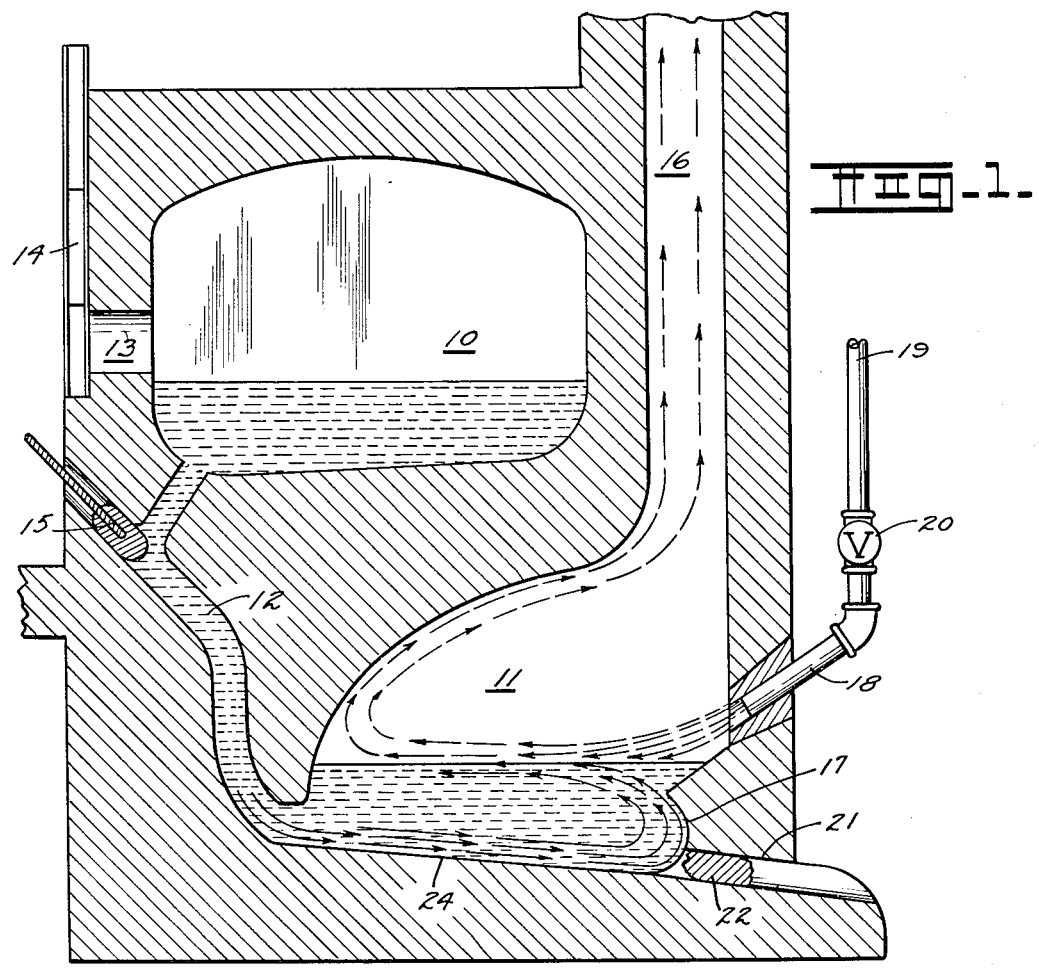
Figure 1 is a cross sectional side elevation of apparatus for making steel.
Figure 2:
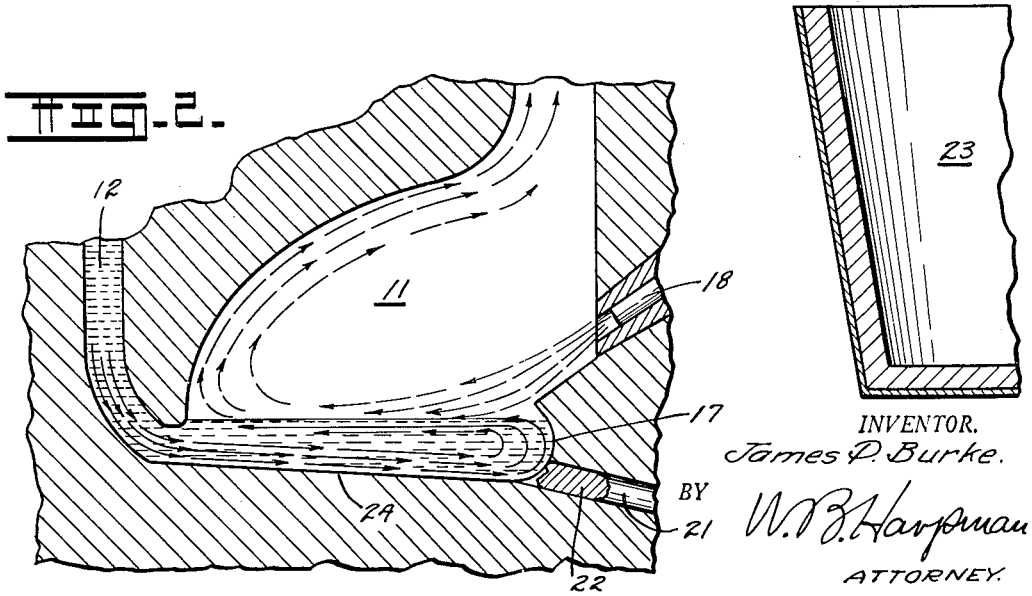
Figure 2 is a vertical section of a portion of the apparatus shown in Figure 1.

By referring to the drawings and Figures 1 and 2 in particular apparatus for progressively subjecting molten steel to an oxygen or oxygen enriched atmosphere for the decarbonization of the steel will be seen. In Figures 1 and 2 of the drawings a conventional open hearth furnace is indicated by the numeral 10 and a retort 11 is formed in the supporting structure of the open hearth furnace with a communicating passageway 12 leading from the bottom of the open hearth furnace to the bottom of the retort 11. The open hearth furnace has the usual charging orifice 13 and charging door 14 and the communicating passageway 12 is normally closed with a metering valve 15.

The retort 11 communicates with a flue 16 and is formed with the wall 17 thereof opposite the inlet of the passageway 12 inclined upwardly and outwardly into the area of the retort 11 so that metal admitted to the retort 11 through the passageway 12 will flow across the bottom of the retort 11 and form a pool. The metal will move against the outwardly and upwardly inclined wall 17 and be caused to flow backwardly across the surface of the pool toward the inlet of the passageway 12.

Means for introducing oxygen or an oxygen enriched atmosphere is provided and comprises a nozzle 18 positioned above the inwardly and upwardly inclined wall 17. Oxygen or an oxygen enriched atmosphere is supplied the nozzle 18 from a supply source 19 and the same is controlled by a valve 20. The retort 11 has a secondary passageway 21 communicating therewith which is normally closed as by a plug 22. It will thus be seen that metal initially subjected to decarbonization in the open hearth furnace 10 may be caused to flow into the retort 11 by opening the metering valve 15. The metal flows through the passageway 12 and across the bottom of the retort 11 where it forms a pool and successively engages the curved end wall 17 to take on a reverse flow as the pool of metal in the retort 11 rises.

During this operation the valve 20 is opened and oxygen or an oxygen enriched atmosphere is admitted under pressure to the retort 11 with the result that the metal is progressively subjected to the decarbonizing action of the oxygen. This action continues until the contents of the open hearth furnace 10 have been transferred to the retort 11 and it will be observed that the construction of the retort 11 and the introduction of the molten metal thereinto through the passageway 12 causes the desired circulation of the metal in the retort 11 which, in addition to the rising level of the pool therein, subjects all of the metal progressively to the action of the oxygen which results in a more rapid and efficient decarbonization of the metal than would otherwise be possible.

Those skilled in the art will recognize the advantages in subjecting the metal progressively to the action of the oxygen rather than subjecting only the surface of a pool of metal to an oxygen treatment as has heretofore been proposed.

When the carbon content of the metal has been lowered to the desired point, the plug 22 is removed and the metal permitted to flow from the retort 11 to the passageway 21 into a ladle or an ingot mold such as illustrated in Figure 1 of the drawings and indicated by the numeral 23.

In Figure 2 of the drawings a portion of the apparatus shown in Figure 1 is illustrated and comprises the retort 11 and the communicating means therewith. In Figure 2 of the drawings solid line arrows indicate the flow of the metal from the passageway 12 into the bottom of the retort 11 across the same and illustrate the reverse flow occasioned by the inwardly and upwardly inclined or curved wall 17. Dotted line arrows indicate the direction of flow of the oxygen or oxygen enriched atmosphere as introduced through the nozzle 18. It will be observed that in Figures 1 and 2 of the drawings the level of the metal in the retort 11 is illustrated at different heights so that the action of the oxygen or oxygen enriched atmosphere introduced into the retort 11 may be seen with respect to the progressive introduction of the metal thereinto. It will be observed that the flow of the metal across the retort 11 is insured by the formation of the bottom 24 in a slight incline away from the inlet of the passageway 12 thus insuring the flow of the metal across the retort 11 and against the inwardly and upwardly curved wall 17 as heretofore described.

Figure 3:
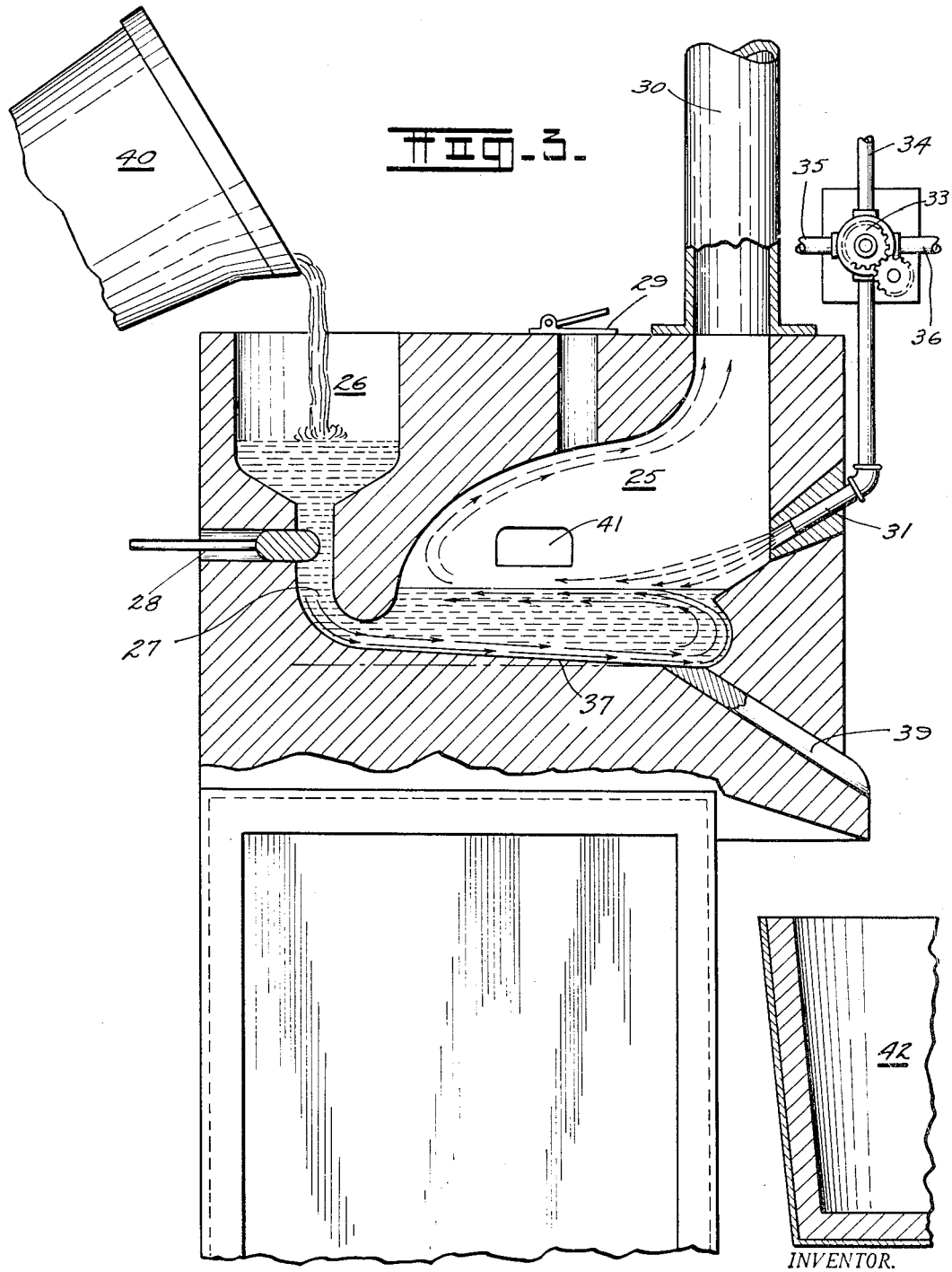
Figure 3 is a vertical section through a modified form of the apparatus illustrated in Figure 1.

The method and apparatus of decorbonizing steel illustrated in Figures 1 and 2 of the drawings is also applicable to decarbonizing iron and in Figure 3 of the drawings apparatus for accomplishing the decarbonization of iron is illustrated. In Figure 3 of the drawings the decarbonizing retort is indicated by the numeral 25 and it communicates with a receiving chamber 26 by way of a passageway 27. A metering valve 28 controls the passageway 27. A charging door 29 is provided which communicates with the retort 25 so that lime may be charged, if desired. A flue 30 communicates with the retort 25 so that the products of combustion may be removed therefrom and a nozzle 31 is provided for the introduction of oxygen or oxygen enriched atmosphere which may include carbon dioxide.

A mixing valve 33 controls the mixture of oxygen and carbon dioxide, as desired, the oxygen being supplied from a supply source 34, the air from a suitable compressed air source 35 and the carbon dioxide from a suitable supply source 36. The bottom of the retort 25 is inclined as indicated by the numeral 37 and the wall of the retort 25 opposite the inlet passageway 27 is inclined inwardly and upwardly and indicated by the numeral 38.

A normally closed, secondary passageway 39 is provided so that the metal may be withdrawn from the retort 25 when it has been decarbonized.

In decarbonizing iron in a process which compares with the Bessemer process, molten iron from a ladle 40 is poured into the receiving chamber 26, the metering valve 28 being operated to permit a progressive flow of the metal into the retort 25 where it flows across the bottom 37 thereof and engages the curved wall 38 so as to be given a reverse flow with respect to the direction of admission. As the metal rises in the retort 25, oxygen or an oxygen enriched atmosphere (which may include carbon dioxide) is introduced through the nozzle 31 and the decarbonization of the metal effected. The metal is thus progressively subjected to the decarbonization action as it progressively enters the retort 25 and progressively flows across the bottom and reverse flow across the top of the pool being formed therein. An opening 41 is provided through which the slag may be run off at the conclusion of the process and the decarbonized metal is then removed from the retort 25 by way of the secondary passageway 39 and directly into a ladle or ingot mold 42.

It will thus be seen that the invention herein disclosed comprises both the method and the apparatus set forth for the rapid and efficient decarbonization for molten iron or steel, the method relating to the progressive subjection of a given quantity of metal to a desired atmosphere and the apparatus including a retort so formed as to make possible the progressive subjection of the said metal to the atmosphere.

It is well known in the art that the decarbonization of iron or steel may be expedited by the subjection of the molten iron or steel to an oxygen or oxygen enriched atmosphere and several proposals have been made and adapted to achieve some of the benefits resulting therefrom. Among these are the common introduction of oxygen or an oxygen enriched atmosphere into an open hearth furnace so that the oxygen or oxygen enriched atmosphere plays across the surface of the pool of metal in the open hearth. It has also been proposed in the prior art to introduce the oxygen or oxygen enriched atmosphere directly into the metal as by inserting a suitable pipe or tube thereinto and forcing the oxygen through the pipe. Neither of these methods nor those known in the art which are similar accomplish the progressive subjection of all of the metal to the oxygen or oxygen enriched atmosphere. This is accomplished in the present invention due to the formation of the apparatus making possible the carrying out of the desired method wherein all of the metal is progressively subjected to the oxygen or oxygen enriched atmosphere by being introduced into a suitable retort from the bottom thereof and caused to flow across the said retort to form a shallow pool, the flow of metal in the pool being reversed as the pool increases in depth so that all of the metal introduced into the pool has the desired turbulence to insure the presentation of all of the metal to the surface of the pool where the oxygen or oxygen enriched atmosphere is introduced.

It will thus be seen that the method and apparatus for decarbonizing metal hereinbefore set forth meets the several objects of the invention.

Having thus described my invention, what I claim is:

1. A metallurgical furnace for introducing oxygen into molten metal, the said furnace including a retort, an inlet orifice in said retort in one side thereof adjacent the bottom thereof, the wall of the retort opposite to the inlet orifice being curved upwardly and inwardly with respect to the bottom wall of the retort, a flue in communication with said retort and means for introducing oxygen into said retort at a point above the said curved wall whereby metal introduced into the retort through the said inlet will flow across the bottom thereof in one direction and be directed by the said curved wall in an opposite direction and across the top of the inflowing metal so that all of the metal introduced progressively flows across the top of a pool formed in the retort and is subjected to the said oxygen.

2. A metallurgical furnace for introducing oxygen into molten metal, the said furnace including a retort, an inlet orifice in said retort in one side thereof adjacent the bottom thereof, the wall of the retort opposite to the inlet orifice being curved upwardly and inwardly with respect to the bottom wall of the retort and the bottom of the retort inclining downwardly and away from the said inlet orifice, a flue in communication with said retort and means for introducing oxygen into said retort at a point above the said curved wall whereby metal introduced into the retort through the said inlet will flow across the bottom thereof in one direction and be directed by the said curved wall in an opposite direction and across the top of the inflowing metal so that all of the metal introduced progressively flows across the top of a pool formed in the retort and is subjected to the said oxygen.

3. The method of decarburizing molten metal of iron-carbon alloy which comprises, introducing into a retort adjacent one side of the bottom thereof, a stream of the molten metal, causing the said stream to flow across the bottom of the retort to the opposite side thereof, directing a blast of oxygen or oxygen rich atmosphere on the surface of the stream, causing the stream of the molten metal to move upwardly and reverse its direction of flow at said opposite edge of the bottom of the retort and to flow over the top of the stream introduced from the first mentioned side of the retort, and continuing to direct said blast on the surface of the reversed stream of molten metal whereby the molten metal thus flowing is progressively subjected to the blast.

4. The method of decarburizing molten metal of iron-carbon alloy which comprises, introducing into a retort, at one side of the retort and adjacent the bottom thereof, a stream of the molten metal, and causing the stream to flow across the bottom of the retort to the opposite side thereof, directing a blast of oxygen or oxygen rich atmosphere on the surface of the stream with the blast directed angularly downwardly in a direction generally opposing that of the direction of the flow of the stream, causing the stream of molten metal to move upwardly and reverse its direction of flow at the opposite edge of the bottom of the retort, and to flow over the top of the stream introduced from the first mentioned side of the retort, and continuing to direct said blast on the surface of the reversed stream angularly downwardly in a direction generally the same as that of the flow of the reversed stream.

5. The method of decarburizing molten metal of iron-carbon alloy which comprises, introducing into a retort with an inclined bottom, at the side of the retort adjacent the high edge of said bottom, a shallow stream of the molten metal which flows across the bottom of the retort, directing a blast of oxygen or oxygen rich atmosphere on the surface of the stream with the blast directed angularly downwardly in a direction generally opposing that of the direction of flow of the stream, causing the stream of molten metal to move upwardly and reverse its direction of flow at the lower edge of the bottom of the retort and to flow over the top of the stream flowing from the high side of said bottom, and continuing to direct said blast on the surface of the reversed stream angularly downwardly in a direction generally the same as that of the flow of the reversed stream.

6. The method of decarburizing molten metal of iron-carbon alloy which comprises, introducing into a retort adjacent one side of the bottom thereof, a stream of the molten metal, causing the said stream to flow across the bottom of the retort to the opposite side thereof, directing a blast of oxygen or oxygen rich atmosphere on the surface of the stream, causing the stream of molten metal to move upwardly and reverse its direction of flow at said opposite edge of the bottom of the retort and to flow over the top of the stream introduced from the first mentioned side of the retort, continuing to thus introduce molten metal into the retort for the flow thereof across the retort under the accumulated molten metal and to flow upwardly and reversely across the retort over the top of the accumulated molten metal, and continuing to direct said blast on the surface of the reversed stream of molten metal, whereby the molten metal thus flowing is progressively subjected to the blast.

7. A retort construction for introducing oxygen to molten metal of iron-carbon alloy, said retort having a bottom wall and side walls, the retort having an inlet orifice at one side thereof adjacent the bottom wall, the side wall of the retort substantially opposite the inlet orifice having a portion extending upwardly and inwardly with respect to the bottom wall of the retort, said bottom wall being inclined downwardly from the side with the inlet orifice to the side with the upwardly and inwardly extending portion, whereby molten metal introduced into the retort through said inlet orifice flows across the bottom wall, said upwardly and inwardly extending portion directing the stream of molten metal upwardly and inwardly of the retort, so that the same flows in the opposite direction crosswise of the retort over the top of the inflowing molten metal, and means for introducing a blast of oxygen or oxygen rich atmosphere into the retort directed against the surface of the molten metal therein, whereby molten metal flowing across the retort is progressively subjected to the blast.

References Cited in the file of this patent

UNITED STATES PATENTS

| | | |
|---|---|---|
| 16,690 | Martien | Feb. 24, 1857 |
| 49,051 | Bessemer | July 25, 1865 |
| 286,110 | Bissell | Oct. 2, 1883 |
| 395,175 | Robert | Dec. 25, 1885 |
| 411,417 | Bookwalter | Sept. 24, 1889 |
| 559,253 | Bertrand et al. | Apr. 28, 1896 |
| 714,450 | Carson | Nov. 25, 1902 |
| 801,500 | Young | Oct. 10, 1905 |
| 1,946,873 | Neuhauss | Feb. 13, 1934 |